INFORMATION STORAGE APPARATUS

Filed Aug. 12, 1959

*INVENTOR.*
Morton Mondschein
*BY*
[signature]
AGENT 3,147,461
Patented Sept. 1, 1964

3,147,461
INFORMATION STORAGE APPARATUS

Morton Mondschein, 120 Christabel St., Lynbrook, Long Island, N.Y., assignor of twenty percent to Camil P. Spiecens, New York, N.Y.

Filed Aug. 12, 1959, Ser. No. 833,231
4 Claims. (Cl. 340—173)

This invention pertains to information processing and more particularly to the storage of information on a record medium.

Information storage systems which use electrical phenomena are generally broken down into two classes. There are relatively high speed systems that employ magnetic or photoelectric techniques; and there are low speed systems which employ conductivity techniques. In general, the high speed systems generate very low level signals that require considerable amplification before they may be usefully employed. On the other hand, the low speed systems such as punched card systems or perforated tape systems generate high level signals that may be directly employed. The low speed systems are inherently slow since mechanical feelers are employed to pass through the holes in the record medium for closing electrical circuits which indicate the presence of information in the record medium. Since the feelers enter the holes in the record medium the reading speeds are deliberately slowed down to prevent the tearing of the record medium.

It is accordingly a general object of the invention to provide an improved information processing system.

It is another object of the invention to provide an information processing system which includes high speed information storage apparatus that generates high level signals during the reading out of information.

It is a further object of the invention to provide an information storage system which requires no punch and die assembly for recording information and accordingly can use the same apparatus for reading and recording information.

It is a still further object of the invention to provide an improved information storage system using a conventional source of electricity to record the information and which generates signals having levels which may directly activate electromechanical devices.

Briefly in accordance with the invention an information storage system is provided which includes a record medium and means for recording information in binary form on the record medium. The record medium includes a surface of insulative material with a plurality of conductive elements disposed on the surface of insulative material. Each of the conductive elements includes first and second terminal means that are bridged by a fusible means which becomes non-conductive when fused. The recording means includes contacting means for electrically contacting the terminals and electric current means couplable to the contacting means for fusing the fusible means associated with the terminals in contact with the contacting means.

It should be noted that many advantages accrue by using conductive elements as a record medium having terminals and fusible means bridging the terminals. Both sides of the record medium may be used to double the storage capacity of the record medium. Furthermore, when the record medium is moving past the contact means the registration problem is minimized since the contacting means may be touching any part of the terminal. The fusible means can therefore be very small in size and accordingly most of the area of the conductive element may be reserved for the terminals.

Other objects, features and advantages of the invention will be apparent from the following detailed description of the invention when read with the accompanying drawings wherein.

Figure 1:
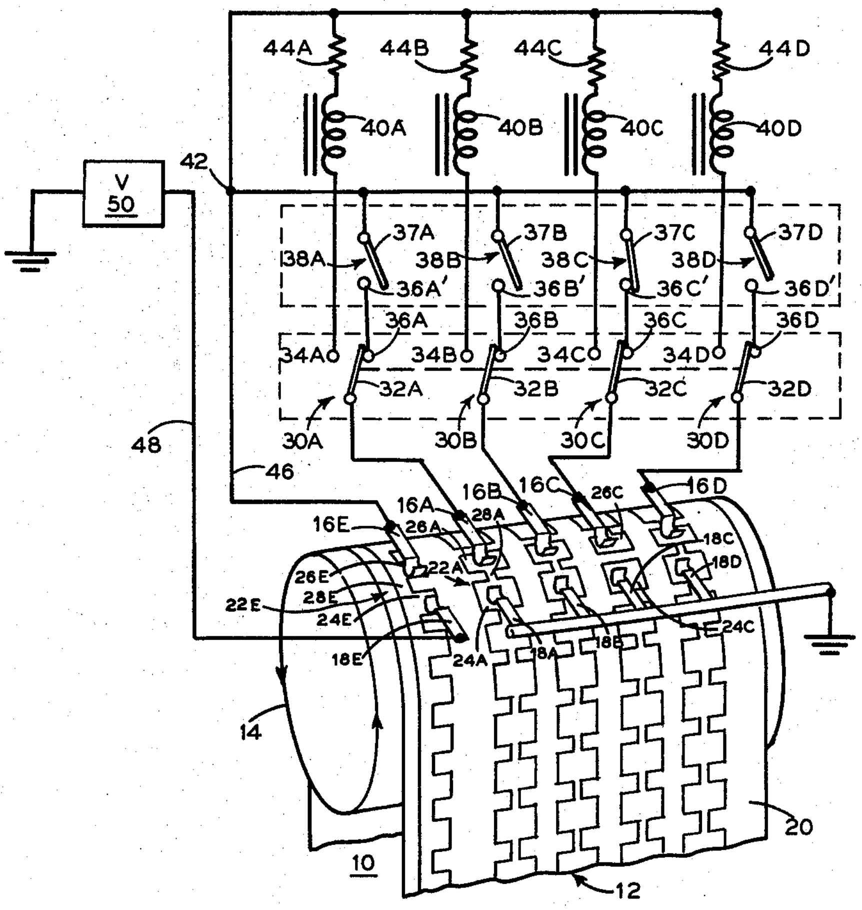
FIGURE 1 is a schematic diagram, partially in perspective, of information storage apparatus which includes a record medium and contacting means in accordance with the invention.

Referring to FIGURE 1 an information storage system 10 is shown comprising a record medium 12 being moved by a rotating drum 14 past a plurality of contacting means or brushes 16A to 16E and 18A to 18E which are connected to electrical circuits, hereinafter more fully described. Information storage system 10 stores information in binary form.

Although record medium 12 may have many forms such as a business machine card it will be shown, by way of example, as an elongated tape. As shown in FIGURE 1, record medium 12 comprises an elongated tape 20 of a non-conductive material such as paper. Five rows A, B, C, D, E of conductive elements, such as conductive element 22A, are disposed on elongated tape 20. Rows A, B, C, D store information while row E provides sprocketing means. Respective conductive elements in each row are in the same transverse line. The conductive element 22A is made of an electrically conductive material such as silver ink which is printed on elongated tape 20 by letterpress, silk-screen, gravure, or other techniques. Also, it may be advantageous to employ aluminum foil elements bonded on paper. Conductive element 22A comprises first and second terminals 24A and 26A which are bridged by a fusible link 28A. It should be noted that terminals 24A and 26A laterally extend beyond the transverse limits of fusible link 28A. The width of fusible link 28A determines the current carrying capacity of conductive element 22A. The greater surface area of terminals 24A and 26A minimize the registration problems associated with brushes 16A and 18A.

Brushes 18A to 18D are connected to ground. Brushes 16A to 16D are respectively connected to the moving contacts 32A to 32D of ganged record-read switches 30A to 30D. Fixed contacts 34A to 34D of record-read switches 30A to 30D are respectively coupled to one end of solenoids 40A to 40D. Fixed contacts 36A′ to 36D′ respectively coupled to fixed contacts 36A to 36D are respectively contactable by the moving contacts 37A to 37D of the bit recording switches 38A to 38D. Moving contacts 37A to 37D are connected in parallel to junction 42. The other ends of solenoids 40A to 40D are respectively connected to one end of current limiting resistors 44A, B, C, D whose other ends are connected to junction 42. Junction 42 is connected via line 46 to brush 16E. Brush 18E is connected via line 48 to source of electrical current 50.

During a recording operation, moving contacts 32A to 32D are respectively positioned against fixed contacts 36A to 36D (the record position). Selected ones of the moving contacts 37A to 37D are positioned against fixed contacts 36A′ to 36D′. When brushes 16E and 18E are respectively in contact with terminals 26E and 24E of the sprocket conductive element 22E a current flows from source 50, via line 48, brush 18E, terminal 24E, fusible link 28E, terminal 26E, brush 16E, line 46 to moving contacts 37A to 37D. Since, as is shown in FIGURE 1 moving contact 37C is connected to fixed contact 36C′ the current flows via moving contact 32C, brush 16C, terminal 26C, fusible link 28C, terminal 24C and brush 18C to ground. This current flow between terminals 24C and 26C causes fusible link 28C to fuse and the current path between terminals 26C and 28C is open circuited. Fusible link 28C is shown in FIGURE 1 after the fusing has occurred. It should be noted that the links of the sprocket conductive elements such as fusible link 28E are designed to carry a current greater than the current required to simultaneously fuse all of the links 28A to 28D.

During a reading operation, the moving contacts 32A to 32D are respectively positioned against the fixed contacts 34A to 34D. When brushes 16E and 18E are in contact with terminals 24E and 26E, a reading of the row of conductive elements 22A to 22D occurs. Current flows from the source 50 via line 48 to brush 18E and conductive element 22E acting as a reading sprocket, brush 16E, line 46 and current limiting resistors 44A to 44D to solenoids 40A to 40D. As is shown in FIGURE 1 current will flow through solenoid 40A, record-read switch 30A, brush 16A, conductive element 22A and brush 18A to ground. In this manner solenoid 40A is energized. Solenoids 40B and 40D are similarly energized since the fusible links 28B and 28D are still conductive. However, since link 28C has fused solenoid 40C remains unenergized. Solenoids 40A to 40D may be employed in conventional decoding matrices to activate conventional printing devices that are well known in the art.

Figure 2:
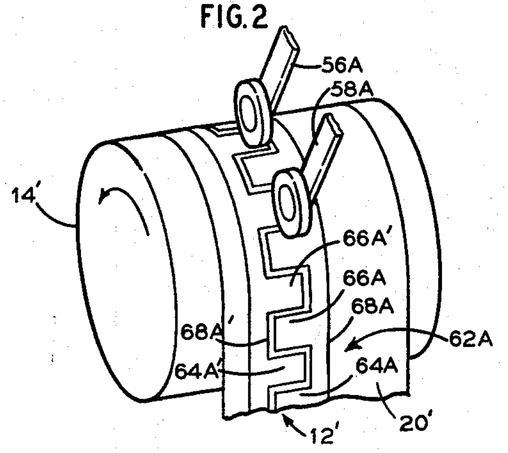
FIGURE 2 shows alternate embodiments of the record medium and contacting means of the information storage apparatus of FIGURE 1.

FIGURE 2 shows an alternate embodiment of the record medium 12. The contacting means are rollers such as rollers 56A and 58A. Such an embodiment is well suited for very high speed operations since there is a minimum of wear of the conducting surfaces of the record medium 12. A typical conductive element 62A comprises terminals 64A and 66A disposed transverse to the direction of motion of the elongated strip 20′. Fusible link 68A bridging terminals 64A and 66A is disposed parallel to the direction of motion of record medium 12′. It should be noted that the fusible link 68A′ which bridges terminals 64A′ and 66A′ is parallel to but, both, longitudinally and transversely displaced from the fusible link 68A. The transverse displacement between fusible links 68A and 68A′ is greater than the width of the rollers 56A and 58A. Therefore, the rollers 56A and 58A never come in contact with the fusible links 68A and 68A′.

Figure 3:
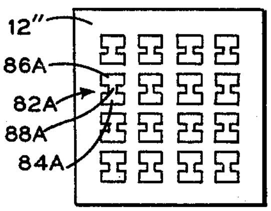
FIGURE 3 shows another alternate embodiment of the record medium of FIGURE 1.

FIGURE 3 shows another embodiment of the record medium 12″. Record medium 12″ has the additional advantage of being two directional. Since the conductive elements of which conductive element 82A is typical are always isolated from each other it is possible to record information as the record medium 12″ is moving horizontally as viewed in FIGURE 3 and to read the stored information when the record medium is moving vertically. An example of a two directional application is when record medium 12″ is in the form of a business machine card or ticket. Conductive element 82A comprises terminals 84A and 86A with a fusible link 88A acting as a conductive bridge.

There has thus been shown improved information storage apparatus which employs fusible links between terminals of a conductive material disposed on an insulative surface. Such a combination permits high speed recording and reading of information at high signal levels. The use of terminals of greater width than the fusible links further simplifies the problems of registering contacting means such as brushes and rollers with the conductive elements. Therefore, the usual difficulties usually associated with the skewing of the record medium as it moves past the contacting means at high speed are avoided.

There will now be obvious to those skilled in the art many modifications and variations which satisfy many or all of the objects, and to which accrue the advantages, but which do not depart from the spirit of the invention as defined in the claims which follow.

What is claimed is:

1. An information storage medium for storing coded combinations of indicia comprising a sheet of insulative material and a plurality of discrete indicium storage elements affixed to said sheet of insulative material in spaced relationship to each other so as to be insulated from each other, each of said indicium storage elements being of an electrically conductive material and comprising first, second and third serially contiguous regions, said second region being intermediate said first and third regions, said first and third regions being adapted to be connected to a source of electric current, said first, second and third regions each having a delimited surface area, the transverse dimension of the surface area of said second region being less than the transverse dimension of the surface area of said first region and of said third region to provide a constricted path of conductive material for the flow of electric current from said first region, via said second region to said third region so that when an electric current greater than a given magnitude is caused to flow from said first region, via said second region to said third region, only said second reigon is vaporized.

2. Information storage apparatus for storing coded combinations of indicia comprising: a record medium including a sheet of insulative material and a multitude of indicium storage elements affixed to said sheet of insulative material in groups having a given pattern wherein the indicium storage elements in each group are insulatively spaced from each other, each of said indicium storage elements being an electrically conductive material and comprising first, second and third serially contiguous regions, said second region being intermediate said first and third regions, said first, second and third regions each having delimited surfaces areas, the transverse dimension of the surface area of said second region being less than the transverse dimension of the surface area of said first region and of said third region to provide a constricted path of conductive material for the flow of electric current from said first region, via said second region, to said third region so that when electric current greater than a given magnitude is caused to flow from said first region, via said second region, to said third region only said second region is vaporized; a multitude of electrical contact means equal to the number of indicium storage elements in a group of indicium storage elements; means for stationarily disposing said electrical contact means for respectively contacting the first and third regions of the indicium storage elements in a group simultaneously; and electric current source means selectively connectable to said electrical contact means whereby coded combinations of indicia are recorded by virtue of the vaporization of said third regions.

3. The apparatus of claim 2 wherein said electrical source means is simultaneously connected to a combination of said electrical contact means.

4. The apparatus of claim 2 wherein one of the indicium storage elements of each group is a sprocketing element, the surface area of the second region of said sprocketing element being greater than the surface area of the second regions of the other indicium storage elements of said group, and including means for connecting said electric current source means via said sprocket element selectively to the electrical contact means associated with the other indicium storage elements of said group.

References Cited in the file of this patent

UNITED STATES PATENTS

| | | |
|---|---|---|
| 173,718 | Edison | Feb. 22, 1876 |
| 2,171,556 | Higginbottom | Sept. 5, 1939 |
| 2,484,642 | Paris | Oct. 11, 1949 |
| 2,688,739 | Hofgaard | Sept. 7, 1954 |
| 2,689,338 | Singleton | Sept. 14, 1954 |
| 2,806,756 | Van Der Werff | Sept. 17, 1957 |
| 2,836,479 | Traub | May 27, 1958 |